(12) United States Patent
Gautam et al.

(10) Patent No.: US 10,095,602 B2
(45) Date of Patent: Oct. 9, 2018

(54) AUTOMATED CODE ANALYZER

(71) Applicant: Syntel, Inc., Troy, MI (US)

(72) Inventors: Ritesh Gautam, Memphis, TN (US); Maneesh Misra, Mumbai Maharashtra (IN); Ritesh Bhinde, Mumbai Maharashtra (IN); Swapnil Jadhao, Navi Mumbai Maharashtra (IN)

(73) Assignee: Syntel, Inc., Troy, MI (US)

( * ) Notice: Subject to any disclaimer, the term of this patent is extended or adjusted under 35 U.S.C. 154(b) by 125 days.

(21) Appl. No.: 14/991,605

(22) Filed: Jan. 8, 2016

(65) Prior Publication Data

US 2016/0124724 A1 May 5, 2016

Related U.S. Application Data

(63) Continuation-in-part of application No. 14/213,429, filed on Mar. 14, 2014, now Pat. No. 9,235,494.

(60) Provisional application No. 61/781,267, filed on Mar. 14, 2013.

(51) Int. Cl.
*G06F 9/45* (2006.01)
*G06F 11/36* (2006.01)

(52) U.S. Cl.
CPC .................. *G06F 11/3616* (2013.01)

(58) Field of Classification Search
CPC ..... G06F 8/71; G06F 11/3616; G06F 17/2705
See application file for complete search history.

(56) References Cited

U.S. PATENT DOCUMENTS

| | | | |
|---|---|---|---|
| 5,659,753 A | 8/1997 | Murphy et al. | |
| 6,275,223 B1 | 8/2001 | Hughes | |
| 6,799,718 B2 | 10/2004 | Chan et al. | |
| 6,993,710 B1 | 1/2006 | Coad et al. | |
| 7,231,633 B2 * | 6/2007 | Grassens | G06F 11/3624 714/E11.207 |
| 7,340,726 B1 | 3/2008 | Chelf et al. | |
| 7,493,658 B2 | 2/2009 | Shipp | |
| 8,001,532 B1 | 8/2011 | Jakubiak et al. | |

(Continued)

OTHER PUBLICATIONS

Halloran et al., "High Quality and Open Source Software Practices", 2002, retrieved from <http://users.ece.utexas.edu/~perry/education/382v-s08/papers/halloran.pdf> Total pp. 3.*

(Continued)

*Primary Examiner* — Marina Lee
(74) *Attorney, Agent, or Firm* — Dykema Gossett PLLC (57) ABSTRACT

A system for analyzing source code may include a computer including a memory and a processor. A discoverer may be stored on the memory and may be configured to automatically identify applications of an infrastructure and extract at least one input source code file corresponding to the identified applications. A file reader may be stored on the memory and may be configured to read the input source code file containing source code written in at least one computer programming language. A metrics accumulator may be stored on the memory and may be configured to analyze the source code components according to one or more rules to generate application metadata. A reporting engine may be stored on the memory and configured to generate a report based on the generated application metadata.

19 Claims, 7 Drawing Sheets

(56) References Cited

U.S. PATENT DOCUMENTS

| | | | |
|---|---|---|---|
| 8,042,098 B2* | 10/2011 | Do | G06F 8/20 |
| | | | 717/101 |
| 9,465,608 B2* | 10/2016 | Araya | G06F 8/447 |
| 2002/0170042 A1* | 11/2002 | Do | G06F 8/54 |
| | | | 717/141 |
| 2003/0018694 A1* | 1/2003 | Chen | G06F 8/60 |
| | | | 709/200 |
| 2003/0028364 A1* | 2/2003 | Chan | G06F 8/33 |
| | | | 704/1 |
| 2009/0138843 A1 | 5/2009 | Hinton et al. | |
| 2009/0144698 A1 | 6/2009 | Fanning et al. | |
| 2009/0182757 A1* | 7/2009 | Lotlikar | G06Q 30/02 |
| 2010/0095277 A1 | 4/2010 | Cheng et al. | |
| 2011/0022551 A1 | 1/2011 | Dixon | |
| 2011/0067009 A1 | 3/2011 | Hosokawa et al. | |
| 2011/0131209 A1* | 6/2011 | Bechtel | G06N 5/025 |
| | | | 707/737 |
| 2012/0174061 A1 | 7/2012 | McCollum et al. | |
| 2013/0055205 A1 | 2/2013 | Sereni et al. | |
| 2013/0174122 A1* | 7/2013 | Watters | G06F 8/36 |
| | | | 717/121 |
| 2013/0290205 A1 | 10/2013 | Bonmassar et al. | |
| 2013/0311968 A1* | 11/2013 | Sharma | G06Q 10/06 |
| | | | 717/101 |
| 2014/0041037 A1* | 2/2014 | Bhatia | G06F 21/10 |
| | | | 726/26 |
| 2014/0123110 A1* | 5/2014 | Wan | G06F 11/3672 |
| | | | 717/124 |
| 2014/0282373 A1 | 9/2014 | Garza | |
| 2014/0282445 A1 | 9/2014 | Gautam | |
| 2016/0124724 A1* | 5/2016 | Gautam | G06F 11/3616 |
| | | | 717/143 |

OTHER PUBLICATIONS

"Micro Focus Enterprise Analyzer" available at http://www.microfocus.com/products/enterprise-analyzer/enterprise-analyzer/index.aspx (retrieved Apr. 9, 2015).

"Cast Application Analytics Dashboard" available at http://www.castsoftware.com/products/application-analytics-dashboard?GADSEOI (retrieved Apr. 9, 2015).

"Smarter Outsourcing for SI and Client" available at http://www.microfocus.com/ (retrieved Apr. 9, 2015).

"ASG Effective Application Management" available at http://www.asg.com/Portfolio/Systems/APPLICATION-MANAGEMENT.aspx (retrieved Apr. 9, 2015).

"ASG Smart Catalog" available at http://www.asg.com/smart-catalog/asg-viewdirect.aspx (retrieved Apr. 9, 2015).

"Business Rule Manager" available at http://www.microfocus.com/products/enterprise-analyzer/enterprise-analyzer/business-rule-manager.aspx (retrieved Apr. 9, 2015).

"Code Analysis Tools" available at http://www.castsoftware.com/products/code-analysis-tools (retrieved Apr. 9, 2015).

"Next Generation Approaches to Application Analysis" available at http://www.hathasystems.com/software-analysis-solutions.htm (retrieved Apr. 9, 2015).

"Data Migration and ETL" available at http://www.hathasystems.com/software-analysis-solutions-dmetl.htm (retrieved Apr. 9, 2015).

"Enterprise View" available at http://www.microfocus.com/products/enterprise-analyzer/enterprise-analyzer/enterprise-view.aspx (retrieved Apr. 9, 2015).

"Extracting System Knowledge to Manage Risk" available at http://www.hathasystems.com/ (retrieved Apr. 9, 2015).

"Improve Code Quality" available at http://www.castsoftware.com/solutions/improve-code-quality/overview (retrieved Apr. 9, 2015).

"HTWC Icon" available at www.htwc.com/download/brochures/ICON-INFO-EN.pdf (retrieved Apr. 9, 2015).

"Re-Platforming" available http://www.hathasystems.com/software-analysis-solutions-replat.htm (retrieved Apr. 9, 2015).

"Prevent, Measure, Improve" available at http://www.castsoftware.com/Solutions (retrieved Apr. 9, 2015).

"Software Maintenance" available at http://www.hathasystems.com/software-analysis-solutions-maint.htm (retrieved Apr. 9, 2015).

"Visual COBOL: The Agent of Change" available at http://www.microfocus.com/downloads/visual-cobol-the-agent-of-change-211036.aspx (retrieved Apr. 9, 2015).

"Software Compliance" available at http://www.hathasystems.com/software-analysis-solutions-comp.htm (retrieved Apr. 9, 2015).

Jay et al., "Cyclomatic Complexity and Lines of Code: Empirical Evidence of a Stable Linear Relationship", J. Software Engineering & Applications, 2009, 2: 137-143.

Halloran et al. "High Quality and Open Source Software Practices", 2002, retrieved from <http://flosshub.org/sites/flosshub.org/files/HalloranScherlis.pdr"> pp. 3.

"Microsoft Visual SourceSafe." Wikipedia. Retrieved from http://en.wikipedia.org/w/index.php?title=Microsoft_Visual_SourceSafe&oldid=442983891 (Nov. 9, 2011).

"PVCS." Wikipedia. Retrieved from http://en.wikipedia.org/w/index.php?title=PVCS&oldid=464736731 (Jan. 14, 2012).

"Team Foundation Server." Wikipedia. Retrieved from Feb. 25, 2012. Retrieved from http://en.wikipedia.org/w/index.php?title=Team_Foundation_Server&oldid=477293847 (Feb. 25, 2012).

* cited by examiner

| Application Name | Time-critical Priority | No. of Files | No. of Fields | No. of Methods | No. of Classes | No. of Unsecured | No. of Secured |
|---|---|---|---|---|---|---|---|
| MES Inventory | 54 | 2344 | 9376 | 112512 | 675072 | 342 | 1710 | 684 |
| CoolStrip Ticket | 243 | 234 | 936 | 11232 | 67392 | 23 | 115 | 46 |
| Accounting | 45 | 56 | 224 | 2688 | 16128 | 124 | 620 | 248 |
| Paging Application | 34 | 73 | 292 | 3504 | 21024 | 12 | 60 | 24 |
| SPC Pro | 3554 | 2146 | 8584 | 103008 | 618048 | 244 | 1220 | 488 |
| TimeCard | 12345 | 15 | 60 | 720 | 4320 | 45 | 225 | 90 |
| Visual Scheduler | 2344 | 124 | 496 | 5952 | 35712 | 56 | 280 | 112 |
| Industrial SQL | 4355 | 456 | 1824 | 21888 | 131328 | 123 | 615 | 246 |
| Sequence Scheduler | 3532 | 12 | 48 | 576 | 3456 | 43 | 215 | 86 |
| Historian | 17 | 765 | 3060 | 36720 | 220320 | 23 | 115 | 46 |

AUTOMATED CODE ANALYZER

CROSS-REFERENCE TO RELATED APPLICATIONS

This application is a continuation-in-part of U.S. patent application Ser. No. 14/213,429, filed Mar. 14, 2014, now pending, which claims priority to U.S. Provisional Application Ser. No. 61/781,267, filed Mar. 14, 2013. The disclosures of all of the above applications are hereby incorporated by reference herein in their entireties.

TECHNICAL FIELD

This disclosure relates generally to computerized systems; in particular, this disclosure relates to computer systems programmed to analyze source code to determine various metrics about the source code.

BACKGROUND

Source code may include a set of computer instructions written in a human-readable format. Source code may be written in one or more computer programming languages that can be executed by a processor after being compiled or interpreted into machine-readable instructions. There are circumstances in which analysis of source code for different metrics, such as size or complexity, can be useful. However, these can be difficult tasks to perform, particularly for an entire code repository. Therefore, there is a need for a tool that analyzes source code in an easier and more effective manner.

SUMMARY

This disclosure relates to an analysis tool in the form of an automated source code analyzer that may parse source code for multiple computer programming languages and collects information about the source code as per the rules it is configured to execute. Data gathered by this tool can then be used for further analysis that may include, but is not limited to, estimation of size, complexity and effort of maintaining an application, analysis of the code quality, adherence to coding standards, identifying areas of performance improvements within the code, and the like. Illustratively, the analysis tool may process source code for multiple languages, examples of which include, but are not limited to, COBOL, Java, C, C++, VB and .Net technologies. In embodiments, the tool may be integrated with a web-based platform, and a reporting feature of the tool can thus be used to deliver reports, in various formats, of the data generated by the tool to a wide variety of local and/or remote users.

In embodiments, this analysis tool may generally be used for a variety of purposes, examples of which include, but are not limited to, estimating the scope and effort required for projects, performing rule-based analysis of source code to assess code quality, identifying performance bottlenecks, and enabling analysis concerning total cost of ownership ideas. The tool is flexible in that it can be configured for multiple applications, such as metrics gathering, code quality checks, and the like, and can be easily integrated into quality/reliability processes for, e.g., early detection of code quality parameters. As compared with conventional manual source code analysis techniques, this tool may significantly reduce the time required to ascertain program structure, execution flow, size, and/or complexity of source code applications.

In embodiments, a system for analyzing source code may comprise one or more computers; a file reader on at least one of the one or more computers that may be configured to read an input source code file containing source code written in at least one computer programming language; and/or a parser on at least one of the one or more computers that may include a plurality of parsers that may each be specific to a different computer programming language. In embodiments, the parser may be configured to parse the source code in the input source code file into source code components based on syntax rules of the at least one computer programming language in which the source code is written. In embodiments, a metrics accumulator on at least one of the one or more computers may be configured to analyze the source code components according to one or more rules to generate application metadata. In embodiments, a reporting engine on at least one of the one or more computers may be configured to generate a report based on the generated application metadata.

In embodiments, a computerized system for analyzing source code may comprise one or more computing devices including a processor, and a memory having instructions stored therein which, when executed by the processor, cause the processor to read an input source code file containing source code written in at least one computer programming language; parse the source code read from source code file into source code components; analyze the source code components in accordance with one or more rules to generate application metadata; and/or generate a report of the analysis from the generated application metadata.

In embodiments, a method of analyzing source code may comprise reading with at least one computer an input source code file containing source code written in at least one computer programming language; parsing with at least one computer the source code in the input source code file into source code components based on syntax rules of the at least one computer programming language in which the source code is written; analyzing with at least one computer the source code components according to one or more rules to generate application metadata; and/or generating with at least one computer a report based on the generated application metadata.

In embodiments, a system for analyzing source code may include a computer including a memory and a processor. In embodiments, a discoverer may be stored on the memory and may be configured to automatically identify applications of an infrastructure and extract at least one input source code file corresponding to the identified applications. In embodiments, a file reader may be stored on the memory and may be configured to read the input source code file containing source code written in at least one computer programming language. In embodiments, a parser may be stored on the memory and including a plurality of parsers that may each be each specific to a different computer programming language. In embodiments, the parser may be configured to parse the source code in the input source code file into source code components based on syntax rules of the at least one computer programming language in which the source code is written. In embodiments, a metrics accumulator may be stored on the memory and may be configured to analyze the source code components according to one or more rules to generate application metadata. In embodiments, a reporting engine may be stored on the memory and configured to generate a report based on the generated application metadata.

Additional features and advantages of various embodiments will become apparent to those skilled in the art upon consideration of the following detailed description of the illustrated embodiments.

BRIEF DESCRIPTION OF THE DRAWINGS

The present disclosure will be described hereafter with reference to the attached drawings which are given as non-limiting examples only.

Corresponding reference characters indicate corresponding parts throughout the several views. The components in the figures are not necessarily to scale, emphasis instead being placed upon illustrating various embodiments. The exemplification set out herein illustrates embodiments, and such exemplification is not to be construed as limiting the scope of the disclosure in any manner.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Figure 1A:
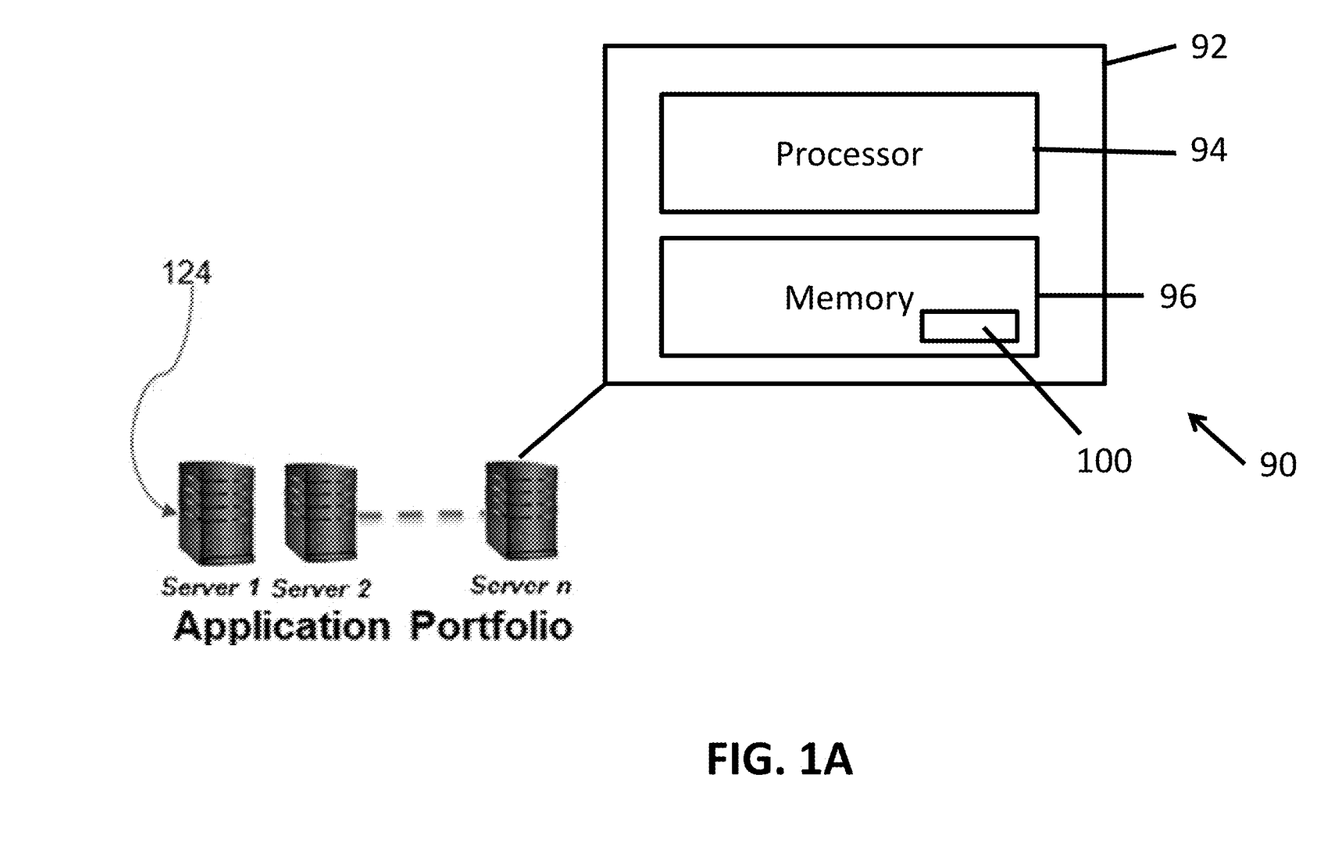
FIGS. 1A and 1B are block diagrams generally illustrating example architectures for an analysis tool in accordance with embodiments of the present disclosure.
Figure 1B:
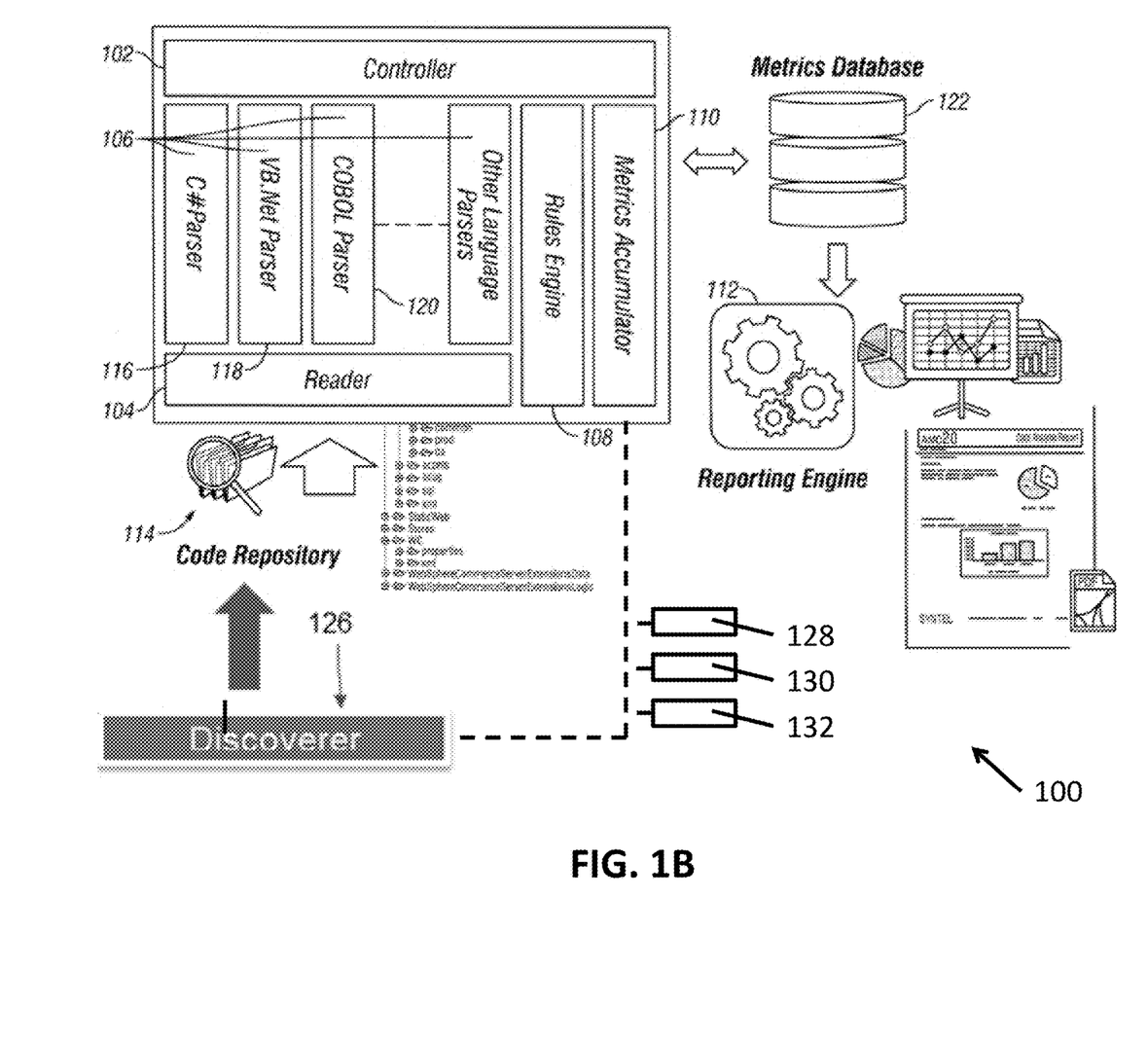

In embodiments, such as generally illustrated in FIGS. 1A and 1B, a computerized system 90 may include a computer 92 that may be programmed with an analysis tool 100. For example, and without limitation, analysis tool 100 may be stored in a memory 96 of computer 92, and/or a processor 94 of computer 92 may be configured to implement analysis tool 100. In embodiments, analysis tool 100 may be configured to analyze source code for one or more computer programs to gather certain metrics associated with the source code. This reduces the time required to understand an application's program structure, execution flow, size and complexity. When performing a software portfolio assessment, for example, the analysis tool 100 could be used to analyze multiple programs to identify outsourcing opportunities, which may be desirable during the transition phase to another program and help understand the application's program structure and execution flow.

FIG. 1B generally illustrates an example system architecture of an embodiment analysis tool 100. In embodiments, analysis tool 100 may include a controller module 102, a file reader module 104, a plurality of parser modules 106, a rules engine 108, a metrics accumulator module 110, and/or a reporting engine 112. The controller module 102 may identify the components required to be executed and/or may control the loading and execution of these components. The file reader module 104 may read input source code files, such as from a code repository 114, which may include source code for a plurality of different computer programs. The file reader module 104 may tokenize the source code and may process comments and/or compiler directives. The file reader module 104 may work in conjunction with a parser module, which may include a plurality of parsers 106, to process source code (e.g., one or more source code files) based on a computer language or languages of the source code to be analyzed.

In embodiments, the parser module may include a plurality of parsers 106. Some or all of the parsers 106 may be configured to process source code written in different computer source code languages such that each such computer language may behandled by a parser 106 specific to that computer source code language. In embodiments, for example, the parser module may include a C# parser 116 that may be configured specifically to parse source code written in the C# computer programming language, a VB.Net parser 118 that may be configured specifically to parse source code written in the Visual Basic (VB.Net) computer programming language, a COBOL parser 120 that may be configured specifically to parse source code written in the COBOL computer programming language, and/or one or more additional parsers (e.g., for other languages and/or for the same languages, which may allow for greater speed/efficiency). The parser module may process each source code file based on the syntax rules of its specific computer language (e.g., using the one of the plurality of parsers 106 that is configured to parse source code written in its specific computer language) and may identify various components of that language, such as variable declaration, classes, modules, methods, program constructs, and/or statements. The parser may use various other components to compute/obtain metrics, resolve references, and/or generate metadata for the application.

In embodiments, rules engine 108 may provide a set of rules for analyzing the source code. For example, the rules engine 108 may include a plurality of different rules for different types of analysis to be performed on the source code. In this manner, a user can select the type of analysis that is desired.

In embodiments, metrics accumulator 110 may generate the application metadata. The application's metadata can be used to generate various outputs that may be desired/requested by the user. In some cases, the results of the analysis may be stored in a metrics database 122. The application metadata and information from the analysis stored in the metrics database 122 may be used by a reporting engine 112 to generate various types of assessment reports for the user. In embodiments, the reports could be output in a format accessible by software development suites (e.g., xls, xlsx, csv, PDF, doc, docx, etc.).

In embodiments, analysis tool 100 may include a discoverer 126 that may be configured to scan the infrastructure 124 (e.g., servers) to find software applications that may be installed and/or hosted in the software environment. Discoverer 126 may then connect with the code repository 114 (e.g., directly) and/or may extract the latest source code. Discoverer 126 may detect the programming language or languages of the source code. The source code for an application portfolio may include more than one programming language.

In embodiments, discoverer 126 may be configured to scan infrastructure 124 according to one or more of a variety of parameters. For example, and without limitation, the parameters may include application technology stack, application tiers (e.g., 2-tier, 3-tier applications), platform, application ecosystems, version control systems, project management tools, monitoring tools, application servers, database vendors, ITSM tools, range of IP addresses, range of ports, and/or other parameters. In embodiments, discoverer 126 may scan only applications that correspond to/conform with one or more of the parameters. In embodiments, discoverer 126 may be configured to determine/obtain characteristics (e.g., static characteristics), which may include application name, size, latest release, build number, owner, and/or other characteristics of extracted source code. In embodiments, discoverer may include an addendum function that may be configured to verify the classification of applications, which may reduce and/or prevent false positive results (e.g., applications that do not actually conform with the parameters).

In embodiments, discoverer 126 may include and/or may be connected to one or more version control adapters 128 that may be configured to extract information and/or source code from version control systems, such as, for example, Serena PVCS, Team Foundation Server (TFS), Visual Source Safe, and/or others.

In embodiments, discoverer 126 may be include a rule-based identification component that may be configured to determine the programming language or languages of source code files, which may include searching for and/or recognizing language specific characteristics, such as libraries, dynamic link libraries (e.g., dll files), java archives (e.g., jar files), and/or file extensions. Automatically identifying software applications may help accelerate evaluation, reduce human error, and/or ensure that software portfolio analysis is performed on the latest version of source code.

In embodiments, metrics accumulator 110 that may be configured to traverse through some or all physical source files and/or to collate state information on parameters, such as file size, lines of code (KLOC), effective KLOC, number of comments, namespaces, class count, method count, variable count, number of blank lines, and/or others. In embodiments, analysis tool 100 may include a rules-based engine 130 that may be configured to evaluate the maturity of code with respect to code duplications, unused code, and/or non-adherence to coding standards, identification and classification of issues. In embodiments, analysis tool 100 may include a database adapter 132 that may be configured to connect analysis tool 100 with database servers, collate information on database schema, on count, and/or on database objects, such as tables, stored procedures, and/or functions.

Figure 2:
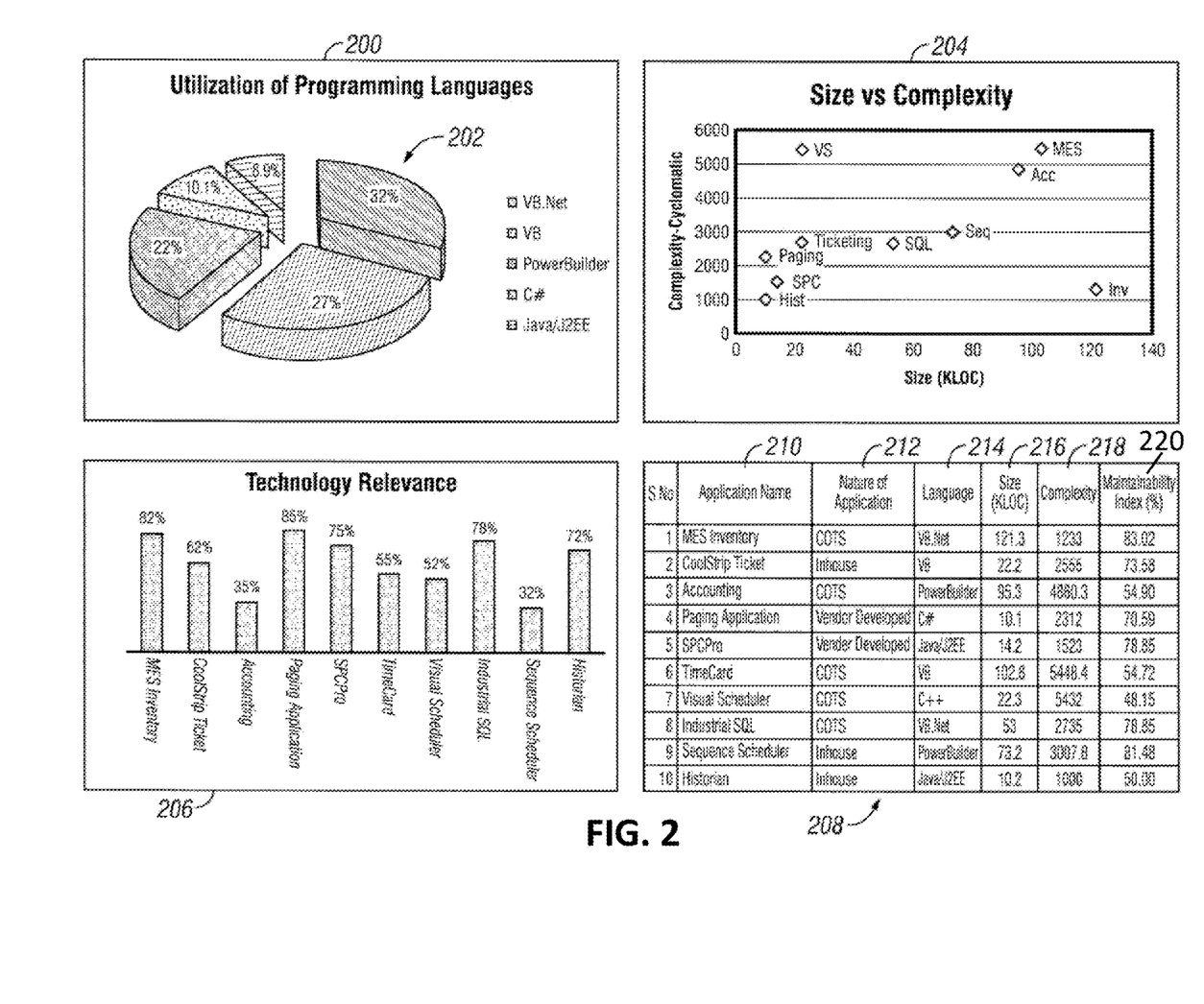
FIG. 2 generally illustrates example reports that could be generated via an analysis tool in accordance with embodiments of the present disclosure.

FIG. 2 generally illustrates examples of some types of reports that may be generated via embodiments of reporting engine 112. A first report 200 may include a pie chart 202 that may include an analysis of programming language utilization. In this example, the pie chart 202 may show the amount (e.g., a percentage) of each programming language that is used within the code repository being analyzed. For example, the relative percentages could correspond to relative lines of code for a first programming language versus a second programming language, etc. Although a pie chart is used in this example, other types of charts could be used to show the relative programming language utilization.

In embodiments, a second report 204 may include a plot of code size (e.g., in thousands of lines of code) versus code complexity (e.g., cyclomatic), which is a software metric related to conditional complexity in code, for various applications. Although the plot shown is size versus complexity, for purposes of example, other metrics analyzed by the analysis tool 100 could be plotted.

In embodiments, a third report 206 may include a bar graph that may include the relative weight regarding technology relevance that has been analyzed for various applications. Although a bar graph is used for purposes of example, this data could be represented in other forms.

Likewise, the particular metric that is shown in this graph is merely for purposes of example and other types of metrics could be plotted.

In embodiments, a fourth report 208 may include a table that may include various metrics for a plurality of applications. In this example, a first column 210 may include a list with the name of a plurality of software applications. A second column 212 may include the nature of the application, such as whether the software was developed in-house, by a third party vendor, or is off-the-shelf. A third column 214 may include the programming language in which the application is written. A fourth column 216 may include the size/thousands of lines of code (KLOC) for each of the applications. A fifth column 218 may include the level of complexity based on a complexity metric. A sixth column 220 may include a metric regarding the maintainability index for each of the applications. Although this information is shown in the form of a table, other manners of visualizing this data could be used.

Figure 3:
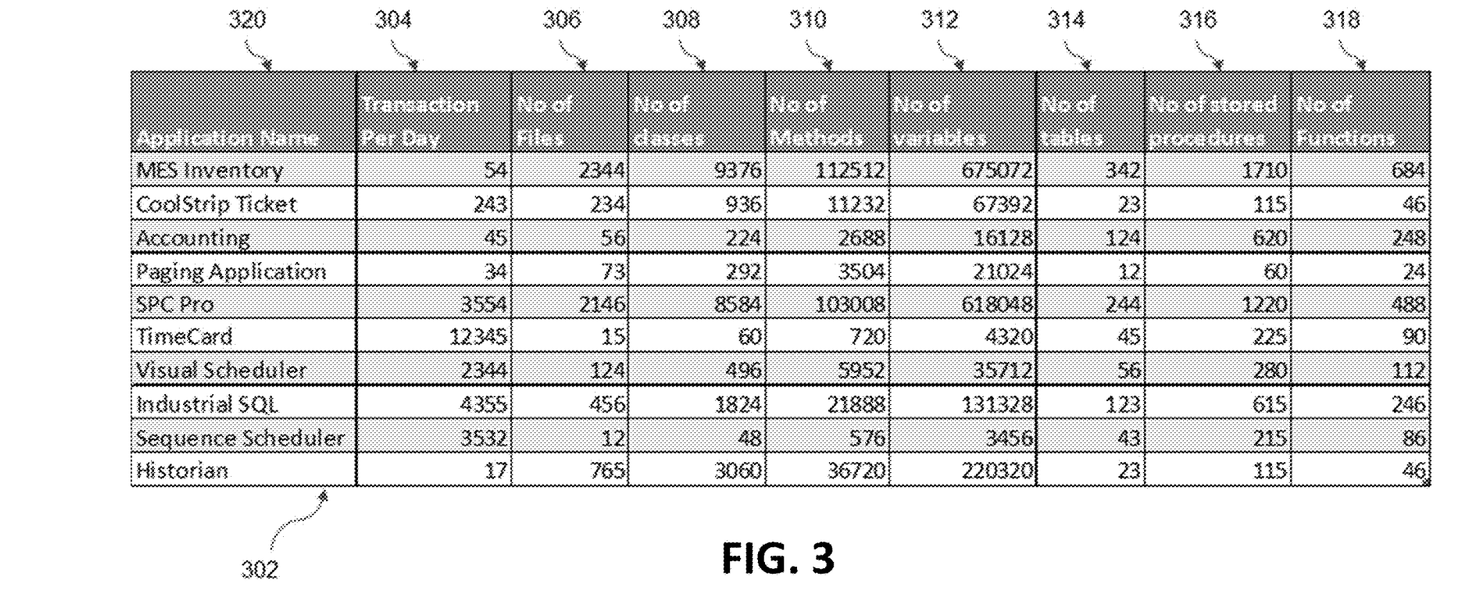
FIGS. 3-6 generally illustrate example reports that could be generated via an analysis tool in accordance with embodiments of the present disclosure.

In embodiments, such as generally illustrated in FIG. 3, reporting engine 112 may generate, determine, and/or report one or more of a plurality metrics, such as in a chart 302. Chart 302 may include, for example, a table of various metrics. A first column 320 may include a list with the names of a plurality of software applications. A second column 304 may include the number of business transactions that the application may be experiencing on a daily basis. A third column 306 may include the number of source code files in the code repository for the application. fourth column 308 may include the total number of classes in the application portfolio. A fifth column 310 may include the number of methods in the application portfolio. A sixth column 312 may include the number of variables being used in the application portfolio. A seventh column 314 may include the number of tables being referenced from the source code for that application. An eighth column 316 may include the number of stored procedures being referenced from the source code for that application. A ninth column 318 may include the number of functions being referenced from the source code for that application. Although chart 302 has been described in connection with these nine metrics in a table format, other manners of visualizing the data/metrics can be used. For example, and without limitation, the plurality of metrics may include the size of source code files (e.g., in megabytes, gigabytes, etc.).

Figure 4:
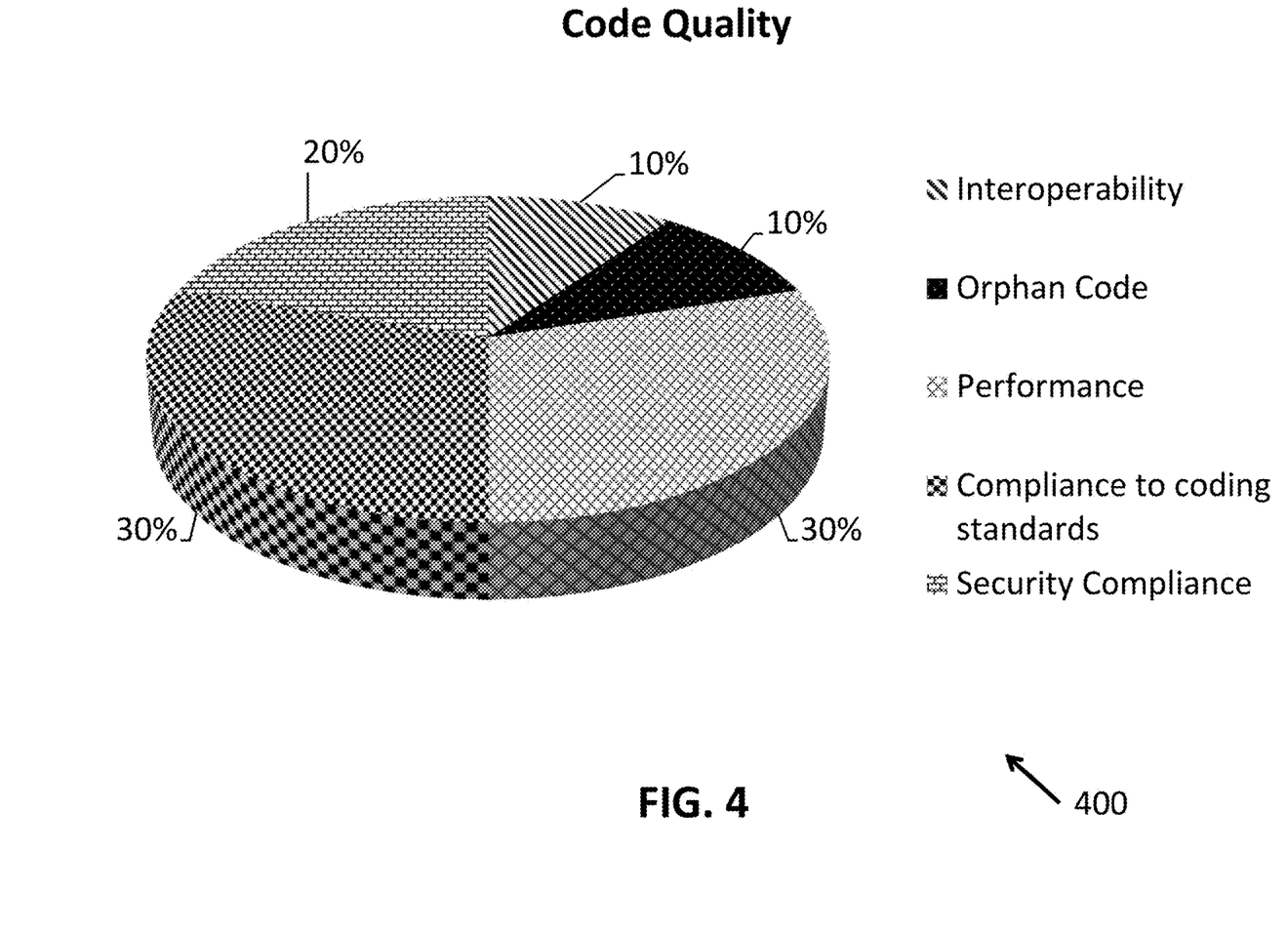
Figure 5:
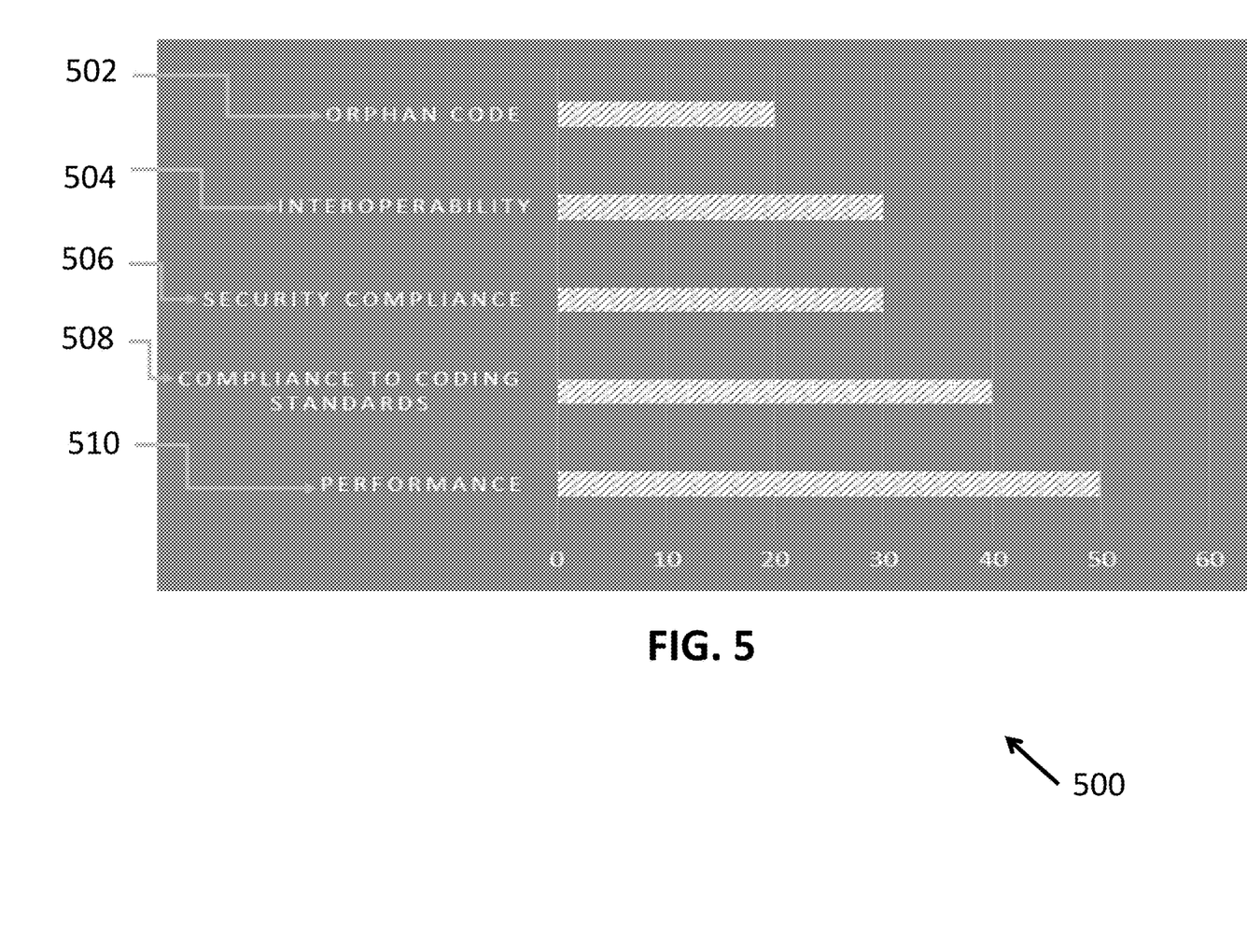

In embodiments, such as generally illustrated in FIG. 4, reporting engine 112 may be configured to generate a pie chart 400 that may display one or more metrics that may be related to the quality of code. In embodiments, such as generally illustrated in FIG. 5, reporting engine 112 may be configured to generate a bar graph 500 that may display one or more metrics that may be related to the quality of code and/or that may be determined via metrics accumulator. The quality of code may be evaluated according to one or more of a variety of quality-related parameters/indicators. For example, quality parameters/indicators may include one or more of:

Orphan code 502—Components that are not being called or part of the code which is unused.

Interoperability 504—Ability of the source code to connect with applications in a heterogeneous environment (e.g., applications developed in a different programming language).

Security compliance 506—Vulnerability of source code to security related violations—Firewall, Authentication, Internal type of security violations may be detected.

Compliance to coding standards 508—Violations to the standards established in an IT environment (e.g., number of critical, major, and minor issues in code compliance).

Performance 510—Performance of the code in terms of speed of execution.

Figure 6:
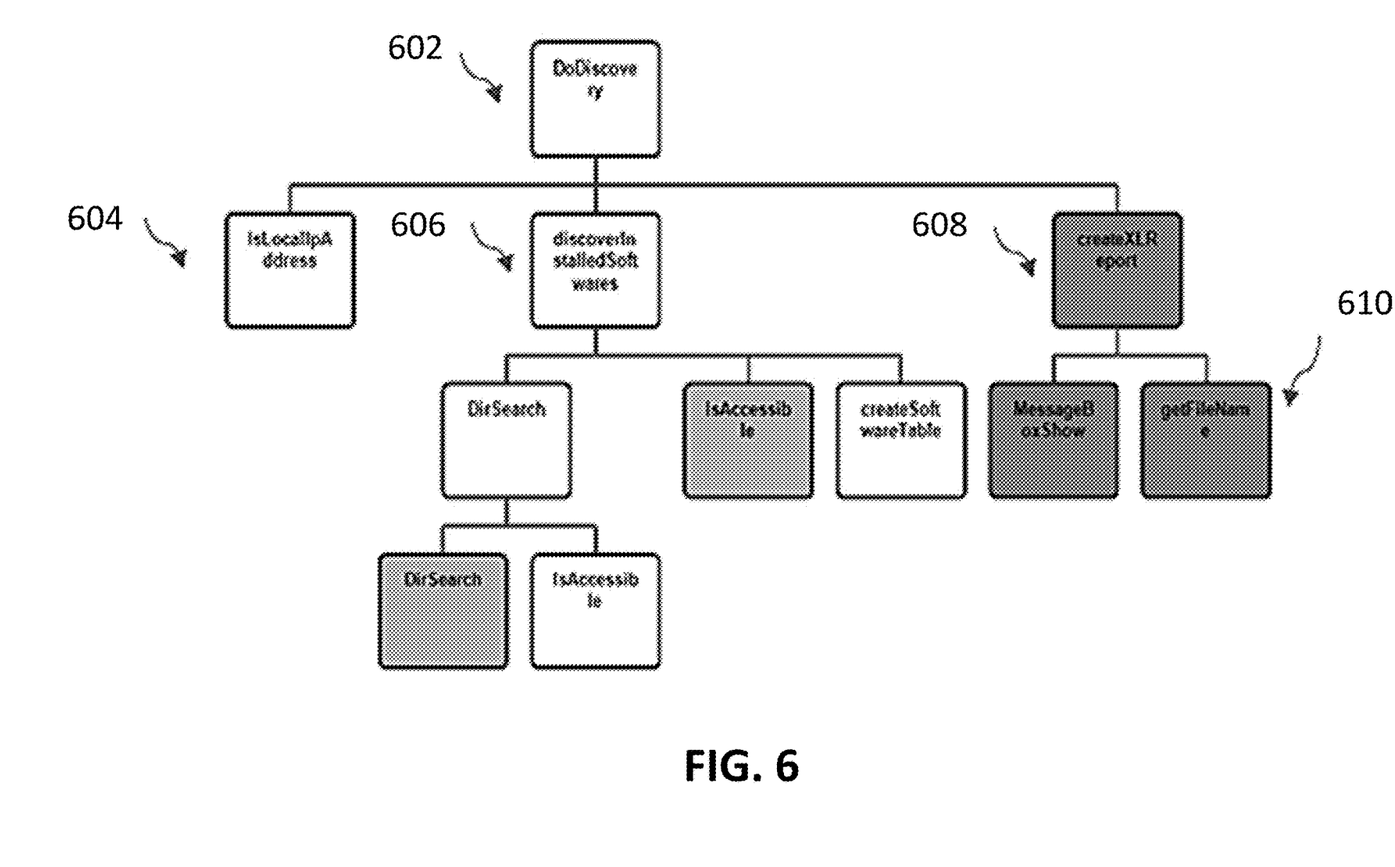

In embodiments, analysis tool 100 may be configured to identify the interoperability of applications. Interoperability may be determined according input/output programming controls (e.g., file readers), networking APIs (e.g., socket connections), protocol usage (e.g., http, ftp, etc.), message brokers, and/or other related components. In embodiments, such as generally illustrated in FIG. 6, reporting engine 112 may be configured to generate a class view diagram of an application correspond to the interoperability of the application. The class view diagram may include a programmatic flow or sequence in which the classes are called and/or a representation of the dependency of the classes on each other. For example, and without limitation, a first class 602 ("DoDiscovery") may call one or more of classes 604 ("IsLocalIpAddress"), 606 ("discoverinstalledSoftwares"), and/or 608 ("createXLReport"). In embodiments, class 608 may call class 610 ("getFileName"). A chain of class dependency may be used for evaluating the impact of a specific line of code. A chain of class dependency may also be helpful if there is a business requirement to be implemented in an existing application and the impact of business change needs to be analyzed.

It should be understood that a system and/or a processor as described herein may include a conventional processing apparatus known in the art, capable of executing preprogrammed instructions stored in an associated memory, all performing in accordance with the functionality described herein. To the extent that the methods described herein are embodied in software, the resulting software can be stored in an associated memory, such as memory, and can also constitute the means for performing such methods. Such a system or processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a non-transitory computer-readable storage medium having a computer program encoded thereon for implementing the system logic and other functionality described herein. The computer program includes code to perform one or more of the methods disclosed herein. Such embodiments may be configured to execute one or more processors, multiple processors that are integrated into a single system or are distributed over and connected together through a communications network, and/or where the network may be wired or wireless. Code for implementing analysis tool 100 may, when executed by a processor, cause a plurality of transistors to change from a first state to a second state. A specific pattern of change (e.g., which transistors change state and which transistors do not), may be dictated, at least partially, by the logic and/or code. For example, and without limitation, in embodiments, processor and/or system may include a plurality of transistors that change state according to system logic and/or code that implements system logic.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "communicate" and "communication" are meant to be construed broadly to encompass both wired and wireless connections and communications. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure as defined in the appended claims.

What is claimed is:

1. A system for analyzing source code, the system comprising:
a computer including a memory and a processor;
a discoverer module stored on the memory, the discoverer module configured to automatically identify applications of an infrastructure and extract at least one input source code file containing source code written in at least one computer programming language corresponding to the identified applications, wherein the discoverer is configured to determine or obtain characteristics of the extracted at least one input source code file containing source code written in the at least one computer programming language;

a file reader module stored on the memory and configured to read the at least one input source code file containing source code written in at least one computer programming language;

a parser module stored on the memory and including a plurality of parsers each specific to a different one of the at least one computer programming language, the parser module configured to parse the source code in the at least one input source code file into source code components based on syntax rules of the at least one computer programming language in which the source code is written;

a metrics accumulator module stored on the memory and configured to analyze the source code components according to one or more rules to generate application metadata; and a reporting engine stored on the memory and configured to generate a report based on the generated application metadata.

2. The system of claim 1, comprising one of more version control adapters.

3. The system of claim 2, wherein the one of more version control adapters are configured to connect the discoverer module to version control systems.

4. The system of claim 1, wherein the characteristics include a name, a size, a latest release, a build number, and an owner.

5. The system of claim 1, wherein the discoverer module includes a rule-based identification component configured to determine the at least one computer programming language or programming languages of the at least one input source code files.

6. The system of claim 5, wherein determining the programming language or programming languages of the at least one input source code file includes searching for or recognizing language-specific characteristics.

7. The system of claim 6, wherein the language-specific characteristics include dynamic link libraries, java archives, and file extensions.

8. The system of claim 1, wherein the discoverer module includes an addendum function configured to reduce false positive results.

9. A system for analyzing source code, the system comprising:
a computer including a memory and a processor;
a file reader stored on the memory and configured to read input source code files of an application portfolio, each input source code file containing source code written in at least one computer programming language;
a parser stored on the memory and including a plurality of parsers each specific to a different one of the at least one computer programming language, the parser configured to parse the source code in the input source code file into source code components based on syntax rules of the at least one computer programming language in which the source code is written;
a metrics accumulator stored on the memory and configured to analyze the source code components according to one or more rules to generate application metadata; and
a reporting engine stored on the memory and configured to generate a report based on the generated application metadata, wherein the report comprises data regarding application infrastructure;
wherein the metrics accumulator is configured to determine a total number of the source code files in the application portfolio, a size of the input source code files, a number of classes in the application portfolio, a number of methods in the application portfolio, and a number of variables in the application portfolio.

10. The system of claim 9, wherein the reporting engine is configured to generate a table, the table including a first column including application names, and additional columns for each of the total number of the input source code files, the size of the input source code files, the number of classes, the number of methods, and the number of variables for each application.

11. The system of claim 9, wherein the metrics accumulator is configured to determine an indicator of code quality.

12. The system of claim 9, wherein the metrics accumulator is configured to determine an indicator of coding standards compliance, an indicator of security compliance, an indicator of interoperability, an indicator of performance, and an indicator of orphan code.

13. The system of claim 12, wherein the reporting engine is configured to display the indicator of orphan code, the indicator of interoperability, the indicator of security compliance, the indicator of performance, and the indicator of coding standards compliance in a bar chart.

14. The system of claim 12, wherein the reporting engine is configured to display the indicator of orphan code, the indicator of interoperability, the indicator of security compliance, and the indicator of coding standards compliance in a pie chart.

15. A system for analyzing source code, the system comprising:
a computer including a memory and a processor;
a file reader stored on the memory and configured to read an input source code file containing source code written in at least one computer programming language;
a parser stored on the memory and including a plurality of parsers each specific to a different computer programming language, the parser configured to parse the source code in the input source code file into source code components based on syntax rules of the at least one computer programming language in which the source code is written;
a metrics accumulator stored on the memory and configured to analyze the source code components according to one or more rules to generate application metadata of an associated application; and
a reporting engine stored on the memory and configured to generate a report based on the generated application metadata, the report including a class view diagram,
wherein the class view diagram comprises a graphical representation of interoperability of the associated applications grouped by at least one of the following levels: an application level, a business level, a namespace level, and a method level.

16. The system of claim 15, wherein the input source code file corresponds to an application and the class view diagram corresponds to the application.

17. The system of claim 16, wherein the class view diagram includes a programmatic flow of sequence in which classes are called.

18. The system of claim 17, wherein the class view diagram includes a chain of class dependency.

19. The system of claim 18, wherein the classes include a first class that calls a first plurality of classes and at least one class of the first plurality of classes calls a second plurality of classes.

* * * * *